United States Patent
Lee et al.

(10) Patent No.: US 8,997,109 B2
(45) Date of Patent: Mar. 31, 2015

(54) APPARATUS AND METHOD FOR MANAGING DATA STREAM DISTRIBUTED PARALLEL PROCESSING SERVICE

(75) Inventors: Myung-Cheol Lee, Daejeon (KR); Hyun-Hwa Choi, Daejeon (KR); Hun-Soon Lee, Daejeon (KR); Byoung-Seob Kim, Daejeon (KR); Mi-Young Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

(21) Appl. No.: 13/585,252

(22) Filed: Aug. 14, 2012

(65) Prior Publication Data
US 2013/0219405 A1    Aug. 22, 2013

(30) Foreign Application Priority Data
Feb. 21, 2012 (KR) .................. 10-2012-0017309

(51) Int. Cl.
G06F 9/46 (2006.01)
G06F 9/50 (2006.01)

(52) U.S. Cl.
CPC .............. *G06F 9/5038* (2013.01); *G06F 9/505* (2013.01)
USPC .......... 718/105; 718/100; 718/101; 718/102; 718/103; 718/104; 718/106; 718/107; 718/108

(58) Field of Classification Search
None
See application file for complete search history.

(56) References Cited

U.S. PATENT DOCUMENTS

| | | | | |
|---|---|---|---|---|
| 6,779,181 | B1 * | 8/2004 | Yu et al. .................. | 718/102 |
| 7,827,286 | B1 * | 11/2010 | Deflaux et al. .............. | 709/226 |
| 2006/0277230 | A1 | 12/2006 | Nishizawa et al. | |
| 2008/0115143 | A1 * | 5/2008 | Shimizu et al. .............. | 718/105 |
| 2009/0164995 | A1 * | 6/2009 | Waris ........................... | 718/100 |
| 2010/0333113 | A1 * | 12/2010 | Johnson et al. .............. | 719/318 |
| 2013/0152057 | A1 * | 6/2013 | Ke et al. ...................... | 717/132 |

OTHER PUBLICATIONS

Daniel J. Abadi et al., "The Design of the Borealis Stream Processing Engine", Proceedings of the 2005 CIDR Conference, 2005, pp. 1-13.

* cited by examiner

*Primary Examiner* — Emerson Puente
*Assistant Examiner* — Dong Kim
(74) *Attorney, Agent, or Firm* — Staas & Halsey LLP (57) ABSTRACT

Disclosed herein are an apparatus and method for managing a data stream distributed parallel processing service. The apparatus includes a service management unit, a Quality of Service (QoS) monitoring unit, and a scheduling unit. The service management unit registers a plurality of tasks constituting the data stream distributed parallel processing service. The QoS monitoring unit gathers information about the load of the plurality of tasks and information about the load of a plurality of nodes constituting a cluster which provides the data stream distributed parallel processing service. The scheduling unit arranges the plurality of tasks by distributing the plurality of tasks among the plurality of nodes based on the information about the load of the plurality of tasks and the information about the load of the plurality of nodes.

14 Claims, 7 Drawing Sheets

APPARATUS AND METHOD FOR MANAGING DATA STREAM DISTRIBUTED PARALLEL PROCESSING SERVICE

CROSS REFERENCE TO RELATED APPLICATION

This application claims the benefit of Korean Patent Application No. 10-2012-0017309, filed on Feb. 21, 2012, which is hereby incorporated by reference in its entirety into this application.

BACKGROUND OF THE INVENTION

1. Technical Field

The present invention relates generally to an apparatus and method for managing a data stream distributed parallel processing service and, more particularly, to an apparatus and method for managing a data stream distributed parallel processing service, which efficiently arrange a plurality of tasks in conformity with load characteristics and use communication means suitable for the structure of a task arrangement when successively processing a plurality of input data streams by executing a plurality of tasks in a distributed and parallel manner, thereby being able to reduce data Input/Output (I/O) load between the tasks of the service attributable to an explosive increase in the input data streams of tasks constituting the service and also to improve I/O performance and data processing performance.

2. Description of the Related Art

With the advent of a ubiquitous computing environment and the rapid development of the user-oriented Internet service market, the number of data streams to be processed has rapidly increased and the types of data streams have been also further diversified. Accordingly, research into the semi-real-time data analysis of massive data streams and data stream distributed parallel processing for providing a processing service has been actively conducted.

Figure 1:
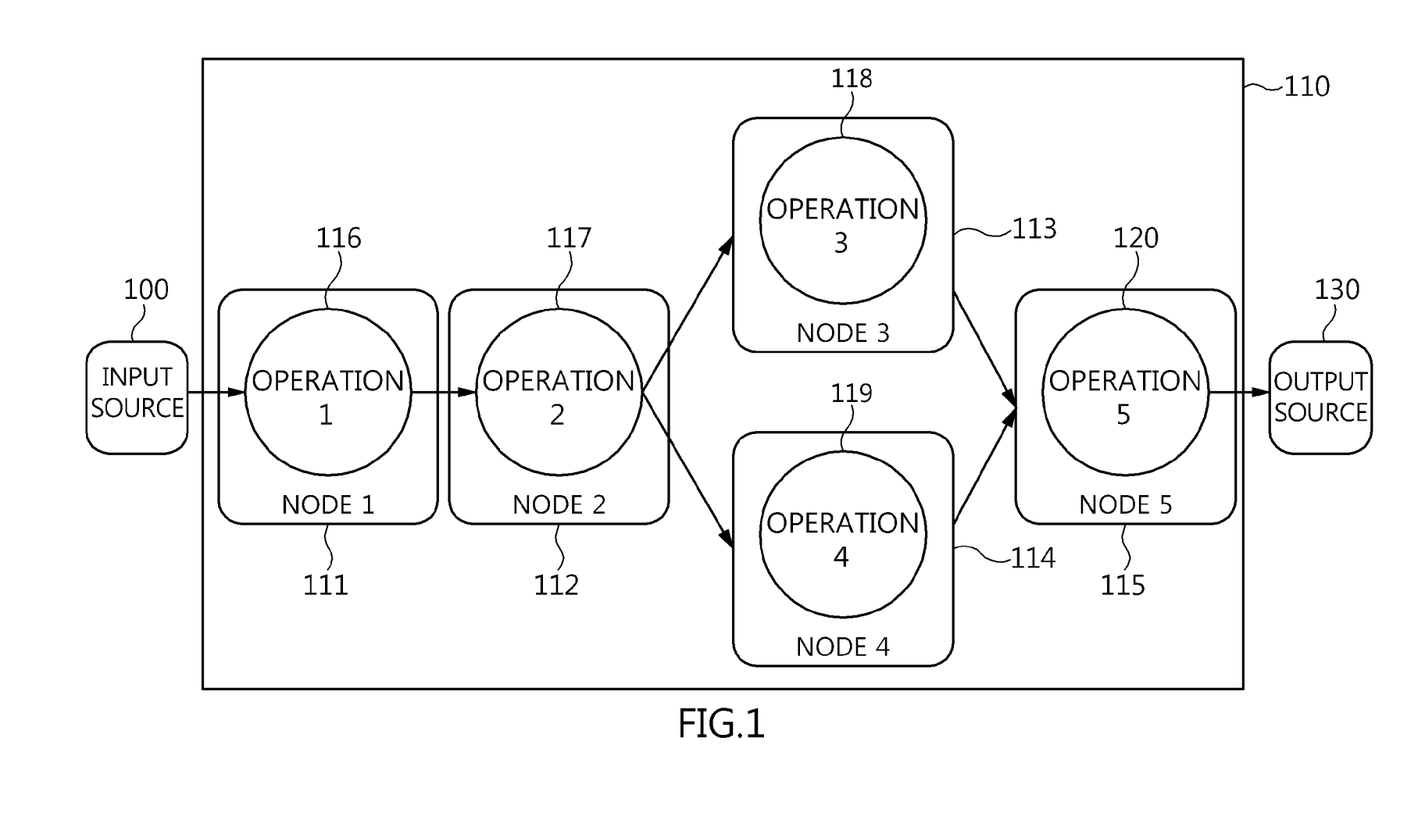
FIG. 1 is a diagram showing an example of a conventional distributed parallel processing service.

FIG. 1 is a diagram showing an example of a conventional distributed parallel processing service.

Referring to FIG. 1, a distributed parallel processing service 110 is connected to an input source 100 and an output source 130. A method of processing input data in the distributed parallel processing service 110 is represented by the definitions of several operations 116 to 120 which describe queries or processing methods for data streams and a Directed Acyclic Graph (DAG) which describes data flows between the operations. The operations 116 to 120 in the conventional distributed parallel processing service 110 are distributed and arranged among several nodes 111 to 115 within a cluster comprised of multiple nodes, and are commonly executed in the form of processes. When the operations start to be executed, the operations are successively executed without terminating the processes. Accordingly, massive data streams may be successively processed rapidly and in parallel.

Although in a conventional distributed parallel processing system based on the above-described conventional distributed parallel processing service, the registered operations of a service are successively executed based on input data streams, the conventional distributed parallel processing system is problematic in that when data streams are explosively increased, successive query processing is delayed because of the shortage of available resources and the distributed data stream processing system experiences an error or stops because of the exhaustion of node resources. In order to overcome these problems, the conventional distributed parallel processing system adopts a method of allocating more node resources, such as memory and a Central Processing Unit (CPU), to problematic operations, a load shedding method of selectively discarding input data streams, or a load migration method of moving an operation from a current node to another node.

However, the method of allocating more node resources is problematic in that it is difficult to utilize it on-line while a service is being performed.

The load shedding method of deleting input data streams is problematic in that it deteriorates the accuracy of the results of successive query processing.

Furthermore, the load migration method is problematic in that when a specific operation cannot be processed at a single node because of an explosive increase in input data streams, this cannot be overcome even though the specific operation is migrated to another node. In particularly, if operations having various load characteristics are simply considered to be computation-intensive operations and are migrated by allocating the redundant CPU resources of other nodes thereto, I/O-intensive operations are subjected to a problem in that a bottleneck phenomenon occurs in resources, such as a disk or network resources, which are more limited than a CPU in a recent hardware environment in terms of performance.

SUMMARY OF THE INVENTION

Accordingly, the present invention has been made keeping in mind the above problems occurring in the prior art, and an object of the present invention is to provide an apparatus and method for managing a data stream distributed parallel processing service, which efficiently arrange a plurality of tasks in conformity with load characteristics and use communication means suitable for the structure of a task arrangement when successively processing a plurality of input data streams by executing a plurality of tasks in a distributed and parallel manner, thereby being able to reduce data I/O load between the tasks of the service attributable to an explosive increase in the input data streams of tasks constituting the service and also to improve I/O performance and data processing performance.

In order to accomplish the above object, the present invention provides an apparatus for managing a data stream distributed parallel processing service, including a service management unit for registering a plurality of tasks constituting the data stream distributed parallel processing service; a Quality of Service (QoS) monitoring unit for gathering information about load of the plurality of tasks and information about load of a plurality of nodes constituting a cluster which provides the data stream distributed parallel processing service; and a scheduling unit for arranging the plurality of tasks by distributing the plurality of tasks among the plurality of nodes based on the information about the load of the plurality of tasks and the information about the load of the plurality of nodes.

The information about the load of the plurality of tasks may include information related to task Central Processing Unit (CPU) load and Input/Output (I/O) load between the tasks.

If I/O overload occurs between the tasks because the I/O load between the tasks is higher than the load of the plurality of nodes included in the information about the load of the plurality of nodes, the scheduling unit may select tasks, causing the I/O overload between the tasks, as I/O overload tasks, and rearrange the I/O overload tasks based on the information about the load of the plurality of tasks and information about the I/O load between the tasks.

The scheduling unit may arrange the I/O overload tasks as separate threads of a single process at a single node.

The I/O overload tasks arranged as the separate threads of the single process may perform data communication using a memory communication method in which a preceding task and a following task directly communicate with each other via a shared memory buffer with the shared memory buffer interposed between the preceding task and the following task.

Tasks, other than the I/O overload tasks arranged as the separate threads of the single process, which belong to the plurality of tasks, may perform data communication using a network communication method in which a preceding task and a following task communicate with each other via a socket or a file I/O communication method in which a preceding task and a following task communicate with each other via a file.

If task CPU overload occurs because the task CPU load is higher than the load of the plurality of nodes included in the information about the load of the plurality of nodes, the scheduling unit may select tasks, causing the task CPU overload, as CPU overload tasks, and rearrange the CPU overload tasks based on the information about the load of the plurality of tasks and the information about the CPU load.

The scheduling unit may arrange the CPU overload tasks as separate processes at separate nodes based on the speed and number of cores disposed at the plurality of nodes.

The QoS monitoring unit may determines QoS, including information about whether I/O overload has occurred between the tasks and whether task CPU overload has occurred, based on the information about the load of the plurality of tasks and the information about the load of the plurality of nodes, and, if it is determined that the QoS is unsatisfactory because the I/O overload has occurred between the tasks or the task CPU overload has occurred, sends a rearrangement request to the scheduling unit so that the plurality of tasks is rearranged at the plurality of nodes.

When the rearrangement request is received from the QoS monitoring unit, the scheduling unit may compare the overload overhead attributable to the occurrence of I/O overload between the tasks, or the task CPU overload with rearrangement overhead attributable to the rearrangement of the plurality of tasks, and rearrange the tasks only when the ratio of the rearrangement overhead to the overload overhead exceeds a specific set value.

In order to accomplish the above object, the present invention provides a method of managing a data stream distributed parallel processing service, including registering, by a service management unit, a plurality of tasks constituting the data stream distributed parallel processing service; gathering, by a Quality of Service (QoS) monitoring unit, information about load of the plurality of tasks and information about load of a plurality of nodes constituting a cluster which provides the data stream distributed parallel processing service; and arranging, by a scheduling unit, the plurality of tasks by distributing the plurality of tasks among the plurality of nodes based on the information about the load of the plurality of tasks and the information about the load of the plurality of nodes.

The information about the load of the plurality of tasks may include information related to task CPU load and I/O load between the tasks.

The method may further include, if I/O overload has occurred between the tasks because the I/O load between the tasks is higher than the load of the plurality of nodes included in the information about the load of the plurality of nodes, selecting, by the scheduling unit, tasks, causing the I/O overload between the tasks, as I/O overload tasks; and rearranging, by the scheduling unit, the I/O overload tasks based on the information about the load of the plurality of tasks and the information about the I/O load between the tasks.

The rearranging the I/O overload tasks may include arranging the I/O overload tasks as separate threads of a single process at a single node.

The method may further include performing, by the I/O overload tasks arranged as the separate threads of the single process, data communication using a memory communication method in which a preceding task and a following task directly communicate with each other via a shared memory buffer with the shared memory buffer interposed between the preceding task and the following task.

The method may further include performing data communication, by tasks, other than the I/O overload tasks arranged as the separate threads of the single process, which belong to the plurality of tasks, using a network communication method in which a preceding task and a following task communicate with each other via a socket or a file I/O communication method in which a preceding task and a following task communicate with each other via a file.

The method may further include, if a task CPU overload has occurred because the task CPU load is higher than the load of the plurality of nodes included in the information about the load of the plurality of nodes, selecting, by the scheduling unit, tasks, causing the task CPU overload, as CPU overload tasks; and rearranging, by the scheduling unit, the CPU overload tasks based on the information about the load of the plurality of tasks and the information about the CPU load.

The rearranging the CPU overload tasks may include arranging the CPU overload tasks as separate processes at separate nodes based on the speed and number of cores disposed at the plurality of nodes.

The method may further include determining, by the QoS monitoring unit, QoS, including information about whether an I/O overload has occurred between the tasks and whether a task CPU overload has occurred, based on the information about the load of the plurality of tasks and the information about the load of the plurality of nodes; and, if it is determined that the QoS is unsatisfactory because the I/O overload has occurred between the tasks or the task CPU overload has occurred, sending, by the QoS monitoring unit, a rearrangement request to the scheduling unit so that the plurality of tasks can be rearranged at the plurality of nodes.

The method may further include, when the rearrangement request is received from the QoS monitoring unit, comparing, by the scheduling unit, the I/O overload between the tasks or overload overhead attributable to the occurrence of the task CPU overload with rearrangement overhead attributable to the rearrangement of the plurality of tasks; and rearranging, by the scheduling unit, the tasks only when a ratio of the rearrangement overhead to the overload overhead exceeds a specific set value.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described below in detail with reference to the accompanying drawings. Here, repetitive descriptions and detailed descriptions of well-known functions or configurations which would unnecessarily obscure the gist of the present invention will be omitted. Embodiments of the present invention are provided to complete the explanation for those skilled in the art of the present invention. Therefore, the shapes and sizes of components in the drawings may be exaggerated to provide more precise descriptions.

Figure 2:
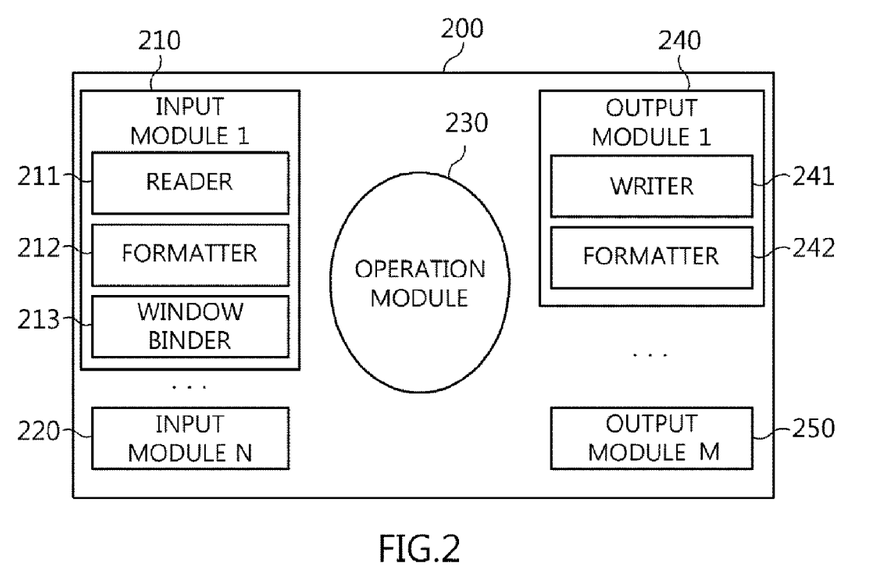
FIG. 2 is a diagram showing an example of the structure of tasks constituting a data stream distributed parallel processing service in an apparatus and method for managing a data stream distributed parallel processing service according to an embodiment of the present invention.

FIG. 2 is a diagram showing an example of the structure of a task constituting part of the data stream distributed parallel processing service in an apparatus and method for managing a data stream distributed parallel processing service according to an embodiment of the present invention.

Referring to FIG. 2, a task 200 constituting part of the data stream distributed parallel processing service basically includes input modules 210 and 220 for receiving and processing N input data streams. Each of the input modules 210 and 220 for respective input data streams of the task 200 may include a reader 211, a formatter 212, and a window binder 213.

The reader 211 indicates information about the input data stream source of the task 200, and represents communication means by which the input data stream source and the task 200 exchange data. The reader 211 functions to actually receive data using the communication means. For example, network communication information is stored when data is exchanged using the Transmission Control Protocol (TCP), a memory address is stored when data is exchanged using memory communication, and a variety of data stream source information, such as related directory and file name information, are stored when data is exchanged using file I/O communication. The reader 211 functions as a channel that receives data using the related communication means. If the input data stream source of a task in question corresponds to the input data stream source of the entire service (i.e., if the task is an initial task and there is no preceding task), communication means for the task and the input data stream source may be determined by a user when the user defines a service. If a task in question is a task that receives processing results from a preceding task, communication means for the task and a related input data stream source may be determined when service is registered with a data stream distributed parallel processing system and then tasks are arranged, or may be dynamically determined by taking into consideration load characteristics when tasks are rearranged depending on node load, task load, and I/O load between the tasks.

The formatter 212 indicates information about the type of input data stream. For example, the formatter 212 may represent a delimiter, a length indicator-based record, a fixed-length record, or a user definition type.

The window binder 213 is used to define the quantity of data streams which are selected from among data streams received from a relevant input data stream source and which can be processed once when a task is performed once. The window binder may be defined based on the number of pieces of data or time (second, minute, and hour).

The task 200 produces processing results by performing operations using an operation module 230 based on N data streams received from N input data stream sources. Here, the data stream processing operations of the operation module 230 may be directly defined by a user, or may be defined by designating operations already registered with the data stream distributed parallel processing system. Meanwhile, the task 200 may generate M output data streams as the results of the data stream processing operations.

Each of output modules 240 and 250 of the task 200 may include a writer 241 for storing information about an output data stream source including data transmission means, such as a network, memory or a file, and a formatter 242 for indicating the type of data stream. If the output data stream source of a task corresponds to the output data stream source of the entire service, communication means for the task and the output data stream source may be determined when a user defines the service. If a following task becomes an output source, communication means for a task and an input data stream source may be determined when tasks are arranged, or may be dynamically determined by taking into consideration load characteristics when tasks are rearranged depending on node load, task load, and I/O load between the tasks.

Figure 3:
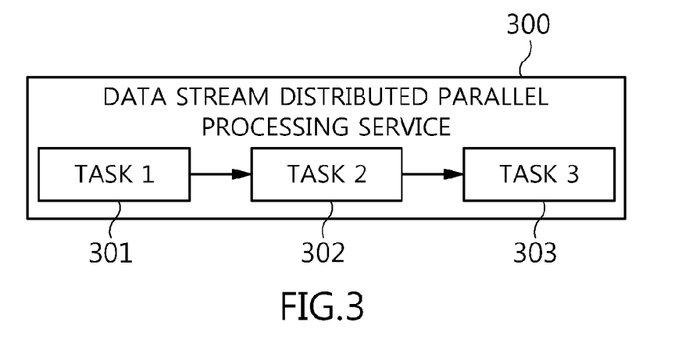
FIG. 3 is a diagram showing an example of the structure of a data stream distributed parallel processing service in the apparatus and method for managing a data stream distributed parallel processing service according to an embodiment of the present invention.

FIG. 3 is a diagram showing an example of the structure of a data stream distributed parallel processing service in the apparatus and method for managing a data stream distributed parallel processing service according to an embodiment of the present invention.

Referring to FIG. 3, in the apparatus and method for managing a data stream distributed parallel processing service according to the embodiment of the present invention, a data stream distributed parallel processing service 300 may include a plurality of tasks 301, 302 and 303. There are flows of data streams among the plurality of tasks 301, 302 and 303. Although the number of tasks of the data stream distributed parallel processing service 300 is illustrated as being 3 in FIG. 3, it is based only on an embodiment. In some other embodiment, the number of tasks may differ.

Figure 4:
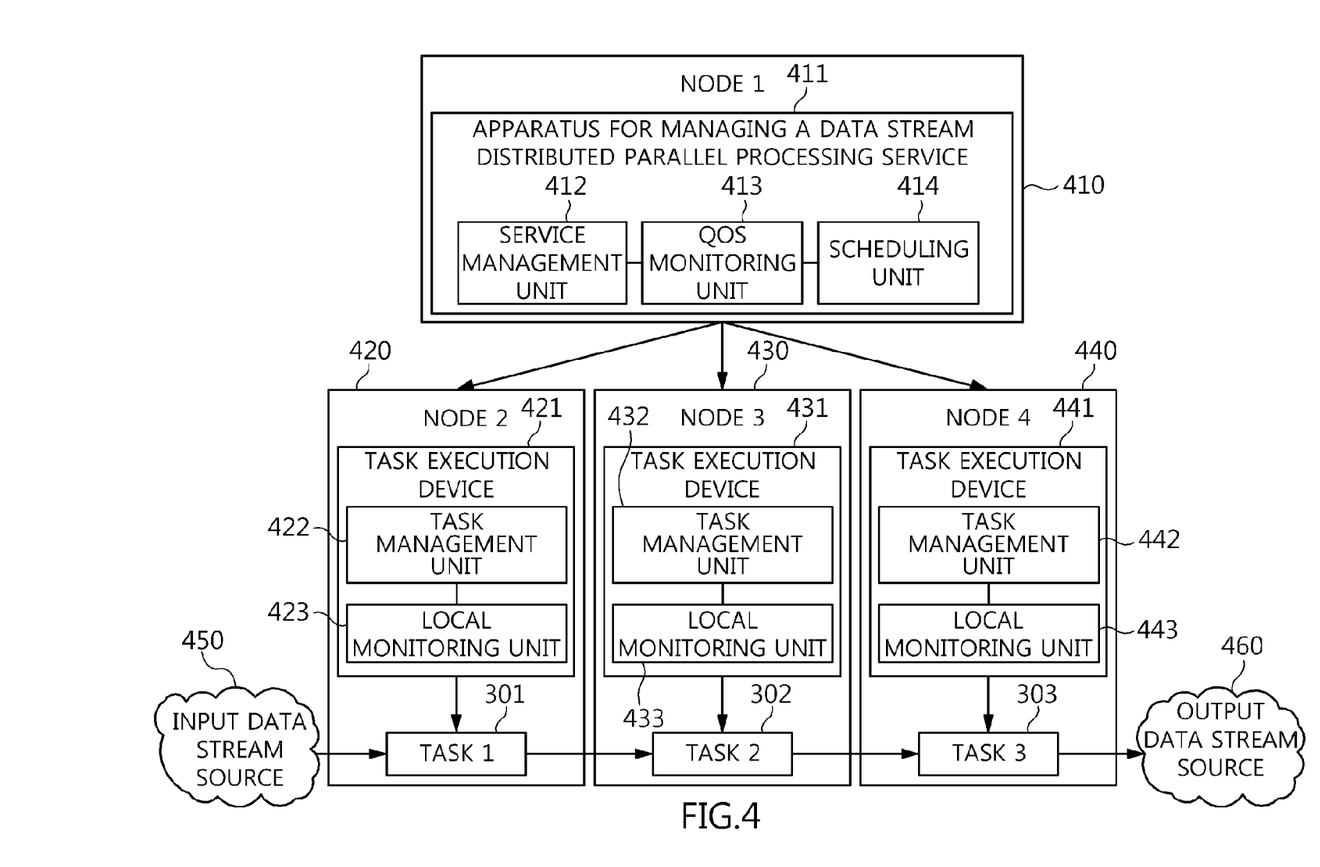
FIG. 4 is a diagram showing a data stream distributed parallel processing system including the apparatus for managing a data stream distributed parallel processing service according to an embodiment of the present invention.

FIG. 4 is a diagram showing a data stream distributed parallel processing system including the apparatus for managing a data stream distributed parallel processing service according to an embodiment of the present invention.

The data stream distributed parallel processing system of FIG. 4 is intended for the data stream distributed parallel processing service of FIG. 3, and may include a cluster, including a plurality of nodes 410, 420, 430 and 440. Although the number of nodes in the data stream distributed parallel processing system is illustrated as being four in FIG.

4, it is based only on an embodiment. In some other embodiment, the number of nodes may differ.

The apparatus for managing a data stream distributed parallel processing service 411 and task execution devices 421, 431 and 441 according to the embodiment of the present invention may be included in the nodes 410, 420, 430 and 440, as shown in FIG. 4. Alternatively, the apparatus for managing a data stream distributed parallel processing service 411 and the task execution devices 421, 431 and 441 according to the embodiment of the present invention may be nodes themselves. Furthermore, the task execution devices 421, 431 and 441 may be located in the nodes 420, 430 and 440, respectively. Meanwhile, the apparatus for managing a data stream distributed parallel processing service 411 may be located in the separate node 410, or may be located in the nodes 420, 430 and 440 in which the task execution devices 421, 431 and 441 are located.

Referring to FIG. 4, the apparatus for managing a data stream distributed parallel processing service 411 may include a service management unit 412, a Quality of Service (QoS) monitoring unit 413, and a scheduling unit 414. The configuration of the apparatus for managing a data stream distributed parallel processing service 411 shown in FIG. 4 is based only on an embodiment, and all the blocks shown in FIG. 4 are not essential elements. In some other embodiment, some of the blocks may be changed or deleted, or some blocks may be added.

The service management unit 412 registers a plurality of tasks that constitute the data stream distributed parallel processing service 300. In addition, the service management unit 412 may perform processing, such as the registration, deletion, and search of a service, in response to a request from a user. Here, the registration of a service refers to the registration of a plurality of tasks 301, 302 and 303 that constitute the data stream distributed parallel processing service 300 of FIG. 3. In an embodiment, the registration of a service may include the allocation of the tasks 301, 302 and 303 constituting the data stream distributed parallel processing service 300 to the plurality of task execution devices 421, 431 and 441 and the execution of the tasks 301, 302 and 303 in a distributed manner. Furthermore, the deletion of service refers to the termination of the execution of related tasks 301, 302 and 303 being executed at multiple nodes and the deletion of all pieces of relevant information. Meanwhile, when registering a service, a user may also register QoS information for each service or task. The QoS may be defined as the throughput of input data.

The QoS monitoring unit 413 gathers information about the load of the plurality of tasks 301, 302 and 303 and information about the load of the plurality of nodes 410, 420, 430 and 440 which constitute a cluster which provides the data stream distributed parallel processing service 300. Here, the information about the load of the plurality of tasks may include information related to the load of a task CPU and I/O load between tasks. That is, the QoS monitoring unit 413 may periodically gather the amount of input load, the amount of output load and data processing performance information for each task and resource use status information for each node via the local monitoring units 423, 433 and 434 of the task execution devices 421, 431 and 441, and may construct and analyze QoS information and task rearrangement information based on the gathered information.

In an embodiment, the QoS monitoring unit 413 may determine whether to rearrange services or the tasks of a service by checking whether a service processing performance threshold received from a user is met or by analyzing the trend of variations in service processing performance over time, and request the determined rearrangement from the scheduling unit 414. Alternatively, the QoS monitoring unit 413 may transfer a request for the rearrangement of a specific task to the scheduling unit 414 when one of the local monitoring units 423, 433, 434 of the task execution devices 421, 431 and 441 makes the request.

The scheduling unit 414 arranges the plurality of tasks 301, 302 and 303 by distributing the plurality of tasks 301, 302 and 303 among the plurality of nodes 420, 430 and 440 based on the information about the load of the plurality of tasks 301, 302 and 303 and the information about the load of the plurality of nodes 420, 430 and 440. The scheduling unit 414 arranges tasks when a request for the arrangement of the tasks based on the registration of service is received from the service management unit 412 or a request for the rearrangement of services or tasks is received from the QoS monitoring unit 413. When a request for the arrangement of tasks is made, the scheduling unit 414 may select a node having redundant resources based on information about the resources of nodes that are managed by the QoS monitoring unit 413, that is, information about the load the nodes, and then allocate one or more tasks to relevant task execution devices. Meanwhile, the scheduling unit 414 may determine policies, such as the adjustment of the ratio of resources allocated to tasks, the migration of tasks, the copy of tasks and load shedding, in response to a rearrangement request. In particular, in the migration of tasks, tasks having high communication load between the tasks may be arranged as separate threads of a single process at a single node by taking into consideration load characteristics between the tasks so that data can be transferred via memory access. When a CPU-intensive operation is performed independently of other tasks, the tasks having a high communication load may be separated from other tasks and arranged as separate processes at separate nodes so that the tasks can be executed in parallel.

Referring back to FIG. 4, each of the task execution devices 421, 431 and 441 may include a task management unit 422, 432 or 442 and a local monitoring unit 423, 433 or 443. The configuration of the task execution devices 421, 431 and 441 shown in FIG. 4 is based only on an embodiment, and all the blocks of FIG. 4 are not essential elements. In some other embodiment, some of the blocks may be changed or deleted or some blocks may be added.

The task management units 422, 432 and 442 may receive respective tasks allocated by the scheduling unit 414 of the apparatus for managing a data stream distributed parallel processing service 411, bind an input data stream source 450 and an output data stream source 460 for the tasks, execute the tasks as tasks of processes separate from those of the task execution devices 421, 431 and 441, and make the tasks be successively performed. Furthermore, the task management units 422, 432 and 442 perform several control commands, such as the allocation and stop of the execution of tasks and the increasing of resources for executing the tasks, which are received from the scheduling unit 414, on the tasks.

The local monitoring units 423, 433 and 443 periodically gather information about the allocation of resources to tasks being executed and information about the use status of the allocated resources and data stream processing performance information, and send them to the QoS monitoring unit 413 of the apparatus for managing a data stream distributed parallel processing service 411.

As described above, the data stream distributed parallel processing service 300 of FIG. 3 is allocated to the multiple nodes 420, 430 and 440 on a task basis by the apparatus for managing a data stream distributed parallel processing service 411 and the task execution devices 421, 431 and 441, and processes data streams in parallel while operating in conjunction with the input data stream source 450 and the output data stream source 460.

When the tasks are allocated to the multiple nodes and are then executed, the tasks are basically executed as tasks of separate processes. The scheduling unit 414 selects an optimum task arrangement and communication means for communication between the tasks, such as file I/O communication, network communication and memory communication having advantages and disadvantages, as shown in Table 1 below, by taking into consideration load characteristics, such as the node load, the task load, and the I/O load between the tasks. Table 1 shows the comparisons of the communication methods between tasks.

in such a manner that the output writer 551 of the preceding task 550 writes data into a shared memory buffer 570 and the input reader 561 of the following task 560 reads the data from the shared memory buffer 570. Here, the output writer 551 of the preceding task 550 may be a memory writer, and the input reader 561 of the following task 560 may be a memory reader. Using this method, data is directly written into the one shared memory buffer 570 and then directly read from the one shared memory buffer 570 without requiring the management of the separate local memory buffers 513 and 523 of respective tasks occurring in network communication, data copy within a kernel, and data copy to a network. In this case, communication performance may be improved by reducing unnecessary overhead.

TABLE 1

| COMMUNICATION METHOD | ADVANTAGE AND DISADVANTAGE | PERFORMANCE |
|---|---|---|
| FILE I/O COMMUNICATION | advantage 1: data communication is basically possible between a single node and multiple processes at a single node<br>advantage 2: it is stored in a permanent depository and can be recovered when an error occurs<br>disadvantage: data copy occurs between storage and network layers | very slow |
| NETWORK COMMUNICATION | advantage 1: data communication is possible between a single node and multiple processes and between multiple modes<br>disadvantage 1: data copy occurs between storage and network layers<br>disadvantage 2: recovery is basically difficult when an error occurs, but a check pointing method can be used | fast |
| MEMORY COMMUNICATION | advantage: data copy does not occur between storage layers<br>disadvantage 1: data communication is basically possible within a single process<br>disadvantage 2: recovery is basically difficult when an error occurs, but a check pointing method can be used | very fast |

In accordance with Table 1, communication between task processes executed at separate nodes or at the same node is performed using network communication via a socket when faster performance is required, and is performed using file I/O communication via local or distributed files when the amount of data is large or when it is necessary that permanence is guaranteed.

Figure 5A:
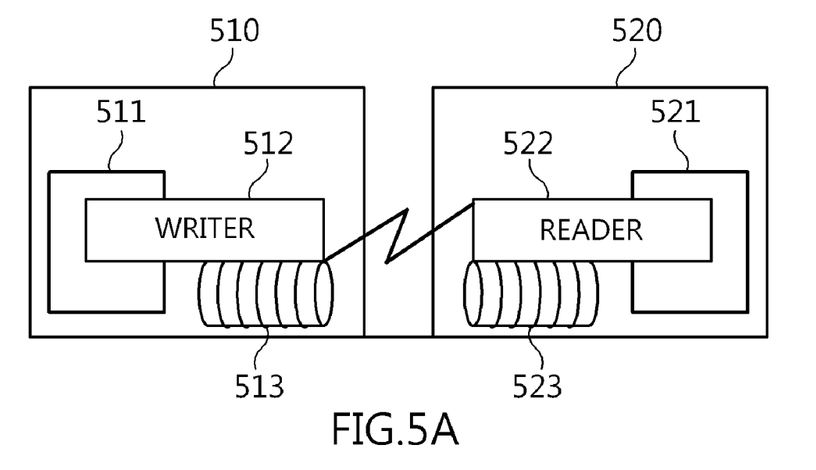
FIGS. 5A and 5B are diagrams illustrating the process structures of network communication and memory communication.
Figure 5B:
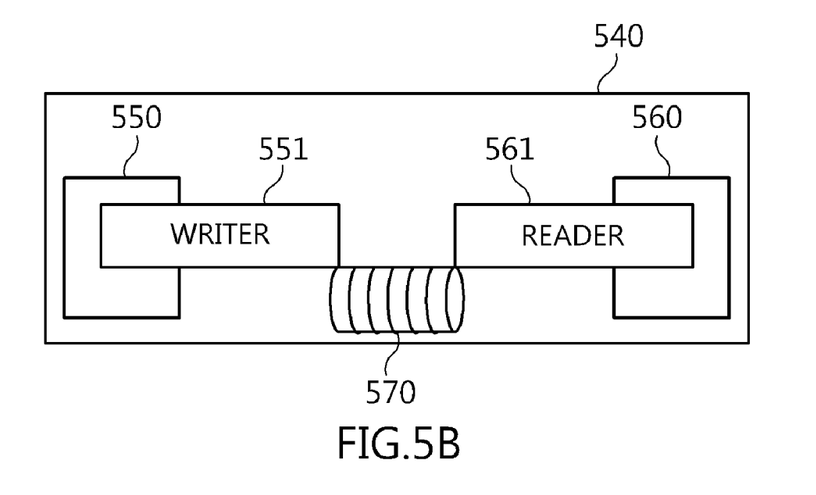

FIGS. 5A and 5B are diagrams illustrating the process structures of network communication and memory communication.

Memory communication via memory access should be used to achieve performance faster than that of the network communication via a socket. FIG. 5A is a diagram showing the process structure of the network communication via a socket. This network communication uses communication means in which different tasks 511 and 521 are processed as separate processes 510 and 520, the preceding task 511 outputs results to a local memory buffer 513, and then the local memory buffer 523 of the following task 521 receives the results via network communication between the output writer 512 of the preceding task 511 and the input reader 522 of the following task 521. Here, the output writer 512 of the preceding task 511 may be a socket writer, and the input reader 522 of the following task 521 may be a socket reader.

FIG. 5B is a diagram showing the process structure of the memory communication via memory access. This memory communication should use a method in which two tasks 550 and 560 exchanging data with each other are executed as the separate threads of a single process 540, and data transfer between the threads of the two tasks 550 and 560 is performed For this purpose, as shown in FIGS. 5A and 5B, it is necessary to use the method in which two tasks 550 and 560 exchanging data with each other are executed as the separate threads of a single process 540 and data transfer between the threads of the two tasks 550 and 560 is performed in such a manner that the output writer 551 of the preceding task 550 writes data into a shared memory buffer 570 and the input reader 561 of the following task 560 reads the data from the shared memory buffer 570, rather than the communication means in which different tasks 511 and 521 are executed as separate processes 510 and 520, the preceding task 511 outputs results to a local memory buffer 513, and then the local memory buffer 523 of the following task 521 receives the results via the network communication between the output writer 512 of the preceding task 511 and the input reader 522 of the following task 521, like in existing network communication. Using this method, data is directly written into the one shared memory buffer 570 and then directly read from the one shared memory buffer 570 without requiring the management of the separate local memory buffers 513 and 523 of respective tasks occurring in network communication, data copy within a kernel, and data copy to a network. In this case, communication performance may be improved by reducing unnecessary overhead.

Successive processing tasks may be classified in terms of the computational load of a task itself and load characteristics related to a preceding task and a following task, that is, the amount of load related to the exchange of data, as in the following Table 2:

TABLE 2

| TASK TYPE | DETAILED CLASS | DESCRIPTION |
| --- | --- | --- |
| IOIT | input intensive | task having a large amount of load of input data |
| | output intensive | task having a large amount of load of output data |
| | input/output intensive | task having both large amounts of loads of I/O data |
| CIT | | task having a small amount of load of I/O data and a heavy computational, or task having performance limited by computational load rather than the amount of load of I/O data |

The performance of a Computation-Intensive Task (CIT) having heavier computational load than Input/Output-Intensive Task (IOIT) is basically limited by the speed of a CPU and the number of CPU cores. Accordingly, when arrangement or rearrangement is scheduled, tasks are arranged not to exceed the overall CPU performance of each node after taking into consideration the number of CPU cores for each node.

The performance of the IOIT having a larger amount of I/O data than a computational load is limited by communication performance which is achieved when a task exchanges data via communication means, such as a file system, memory and a network, that is, file I/O performance, memory I/O performance, network bandwidth and network delay. Accordingly, tasks having large amounts of communication should be arranged so that they can use faster communication means after taking into consideration the basic performance of each communication method, the I/O relationship between the tasks, and the amounts of load.

As can be seen from Table 1, the performance of the file I/O communication is slowest, the performance of the network communication is slow, and the performance of the memory communication is fastest. Therefore, the scheduling unit 414 of the apparatus for managing a data stream distributed parallel processing service 410 according to the embodiment of the present invention arranges tasks having large amounts of I/O data so that they perform memory communication with each other as much as possible, and preceding and following task exchanging data may be executed as the separate threads of the same process so that the tasks can perform memory I/O.

As described above, the scheduling unit 414 makes a final scheduling decision while taking into consideration the status of the load of all the nodes constituting a cluster and the status of the execution of services or tasks, as well as the above-described scheduling decision based on the load characteristics of each task. This will now be described with reference to FIG. 4.

In an embodiment, when I/O overload occurs between tasks because the I/O load between tasks is higher than the load status of the plurality of nodes 420, 430 and 440 included in information about the load of the plurality of nodes 420, 430 and 440, the scheduling unit 414 may select tasks, causing the I/O overload, as I/O overload tasks, and rearrange the I/O overload tasks based on the information about the load of the plurality of tasks and the I/O load between the tasks.

Here, the scheduling unit 414 arranges the I/O overload tasks as the separate threads of a single process at a single node. The tasks newly arranged as the separate threads of the single process as described perform data communication via the memory communication in which a preceding task and a following task directly communicates with each other via a shared memory buffer with the shared memory buffer interposed between the preceding task and the following task. Furthermore, tasks, other than I/O overload tasks arranged as the separate threads of a single process, perform data communication via the network communication in which a preceding task and a following task perform data communication via a socket or the file I/O communication in which a preceding task and a following task perform data communicate via a file.

In another embodiment, when task CPU overload occurs because task CPU load is higher than the load status of the plurality of nodes 420, 430 and 440 included in the information about the load of the plurality of nodes 420, 430 and 440, the scheduling unit 414 may select tasks, causing the task CPU overload, as CPU overload tasks, and rearrange the CPU overload tasks based on the information about the load of the plurality of tasks and the task CPU load.

Here, the scheduling unit 414 arranges the CPU overload tasks as separate processes at separate nodes based on the speed and number of cores installed at the plurality of nodes 420, 430 and 440.

Figure 6A:
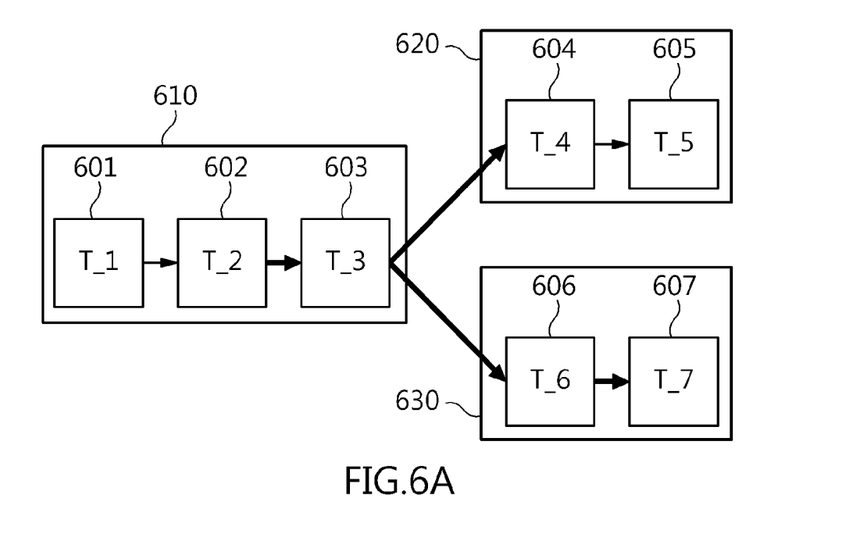
FIGS. 6A and 6B are diagrams showing the status of I/O load between tasks before and after rearrangement according to the apparatus and method for managing a data stream distributed parallel processing service according to an embodiment of the present invention.
Figure 6B:
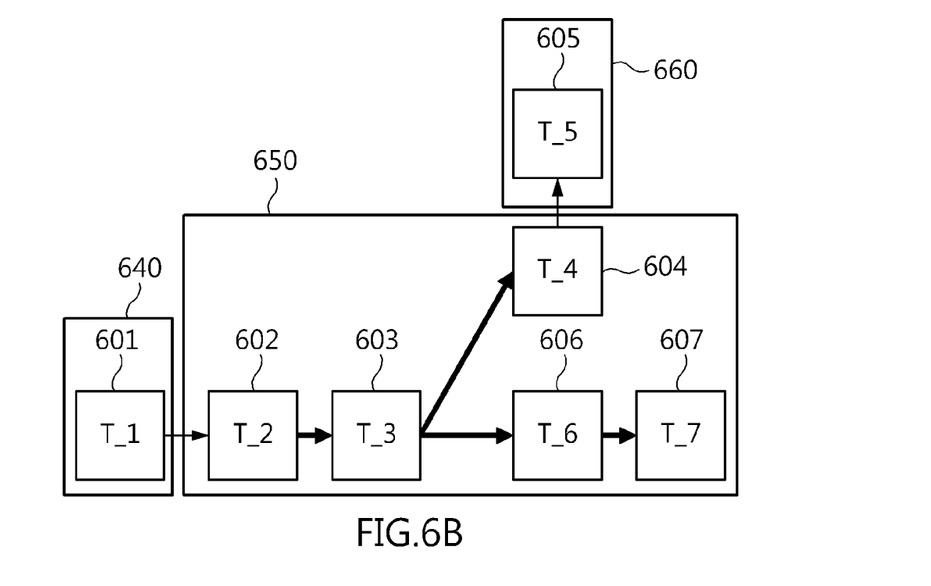

FIGS. 6A and 6B are diagrams showing the status of I/O load between tasks before and after rearrangement according to the apparatus and method for managing a data stream distributed parallel processing service according to an embodiment of the present invention.

FIG. 6A shows the status of I/O load between tasks 601, 602, 603, 604, 605, 606 and 607 before rearrangement, and shows an embodiment of the status of I/O load between the tasks which is measured when the tasks are arranged at multiple nodes within a specific service and are successively executed as the threads of multiple processes 610, 620 and 630. In FIG. 6A, thick solid arrows indicate that the I/O load is high, and thin solid arrows indicate that the I/O load is low. Furthermore, based on the scheduling information including the relationships between the tasks which is found when the scheduling unit makes an initial scheduling decision, the tasks T_1 601, T_2 602 and T_3 603 are allocated to the process 610 and are then executed, the tasks T_4 604 and T_5 605 are allocated to the process 620 and are then executed therein, and the tasks T_6 606 and T_7 607 are allocated to the process 630 and are then executed. Thereafter, when the I/O load between the tasks is measured while the tasks are executed and perform input data streams, a large amount of I/O data occurs in communication between the tasks T_2 602 and T_3 603, communication between the tasks T_3 603 and T_4 604, communication between the tasks T_3 603 and T_6 606, and communication between the tasks T_6 606 and T_7 607, as can be seen from FIG. 6A. Furthermore, it can be seen that the communication between the tasks T_3 603 and T_4 604 and the communication between the tasks T_3 603 and T_6 606 are performing using socket communication means having both a large amount of communication between different processes and poor performance.

FIG. 6B shows the status of I/O load between tasks 601, 602, 603, 604, 605, 606 and 607 after rearrangement, and shows an embodiment of the status of task arrangement and the status of load after the scheduling unit has rearranged tasks, having a large amount of I/O data, as one process based on the information about I/O load which is found in FIG. 6A. As shown in FIG. 6B, the tasks 602, 603, 604, 606 and 607 having a large amount of I/O data are collectively arranged in one process 650 and the tasks 602, 603, 604, 606, and 607 perform mutual communication via memory I/O, thereby improving communication performance. Furthermore, based on an overall scheduling decision including the status of the load of each node, the remaining tasks T_1 601 and T_5 605 are arranged in separate processes 640 and 660 at separate nodes, and are then executed.

In accordance with the embodiment of the present invention, if tasks are arranged in one process and communicate using the memory communication via memory I/O when an I/O load between the tasks increases as shown in FIG. 6B, data stream parallel processing performance may be guaranteed and improved without deteriorating service accuracy. Here, when tasks are rearranged within a service, the temporary stopping of the execution of related tasks or the buffering of the I/O data streams of related tasks may be required. Accordingly, when the structure of the execution of tasks is changed, the administrator of the system according to the embodiment of the present invention needs to find a point of compromise between overhead occurring in a process of rearranging the tasks and improved performance obtained after the rearrangement of the tasks by setting a specific set value for the amount of load.

For this purpose, the QoS monitoring unit 413 of FIG. 4 may determine QoS, including whether I/O overload has occurred between a plurality of tasks and whether task CPU overload has occurred, based on information about the load of the tasks and information about the load of a plurality of nodes. If it is determined that the QoS is not met because the I/O overload between the tasks or the task CPU overload have occurred, the QoS monitoring unit 413 may send a rearrangement request to the scheduling unit 414 so that the plurality of tasks is rearranged at a plurality of nodes. When the rearrangement request is received from the QoS monitoring unit 413, the scheduling unit 414 may compare the I/O overhead between the tasks or overload overhead attributable to the occurrence of the task CPU overload with rearrangement overhead attributable to the rearrangement of the plurality of tasks. Only when the ratio of the rearrangement overhead to the overload overhead exceeds a specific set value, the scheduling unit 414 may rearrange the tasks. This will be described in greater detail later with reference to FIG. 8.

Figure 7:
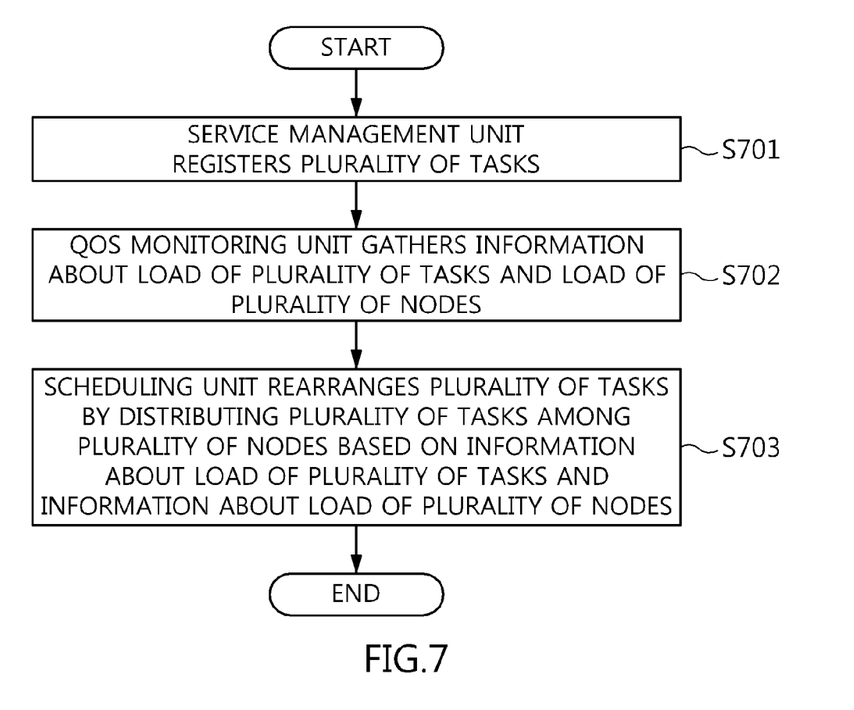
FIG. 7 is a flowchart illustrating a method of managing a data stream distributed parallel processing service according to an embodiment of the present invention.

FIG. 7 is a flowchart illustrating a method of managing a data stream distributed parallel processing service according to an embodiment of the present invention.

Referring to FIG. 7, first, when the method of managing a data stream distributed parallel processing service according to the embodiment of the present invention is initiated, the service management unit 412 registers a plurality of tasks which constitute the data stream distributed parallel processing service at step S701.

Furthermore, the QoS monitoring unit 413 gathers information about the load of the plurality of tasks and information about the load of a plurality of nodes constituting a cluster that provides the data stream distributed parallel processing service at step S702. Here, the information about the load of the plurality of tasks may include information related to task CPU load and I/O load between the tasks.

Once the QoS monitoring unit 413 has gathered the information about the load of the plurality of tasks and the information about the load of the plurality of nodes, the scheduling unit 414 rearranges the plurality of tasks by distributing the plurality of tasks among the plurality of nodes based on the information about the load of the plurality of tasks and the information about the load of the plurality of nodes at step S703.

In an embodiment, in the method of managing a data stream distributed parallel processing service according to the embodiment of the present invention, if I/O overload occurs between tasks because the I/O load between tasks is higher than the load of the plurality of nodes included in the information about the load status of the plurality of nodes, the scheduling unit 414 may select tasks, causing the I/O overhead between the tasks, as I/O overload tasks, and rearrange the I/O overload tasks based on the information about the load of the plurality of tasks and the information about the I/O load between tasks.

Here, the scheduling unit 414 arranges the I/O overload tasks as the separate threads of a single process at a single node. The tasks newly arranged as the separate threads of the single process as described perform data communication via the memory communication in which a preceding task and a following task directly communicate with each other via a shared memory buffer with the shared memory buffer interposed between the preceding task and the following task. Furthermore, tasks, other than I/O overload tasks arranged as the separate threads of a single process, perform data communication via the network communication in which a preceding task and a following task perform data communication via a socket or the file I/O communication in which a preceding task and a following task perform data communication via a file.

In another embodiment, in the method of managing a data stream distributed parallel processing service according to the embodiment of the present invention, if task CPU overload occurs because the task CPU load is higher than the load status of the plurality of nodes included in information about the load of the plurality of nodes, the scheduling unit 414 may select tasks, causing the task CPU overload, as CPU overload tasks, and rearrange the CPU overload tasks based on the information about the load of the plurality of tasks and information about the task CPU load.

Here, the scheduling unit 414 arranges the CPU overload tasks as separate processes at separate nodes based on the speed and number of cores installed at the plurality of nodes.

Figure 8:
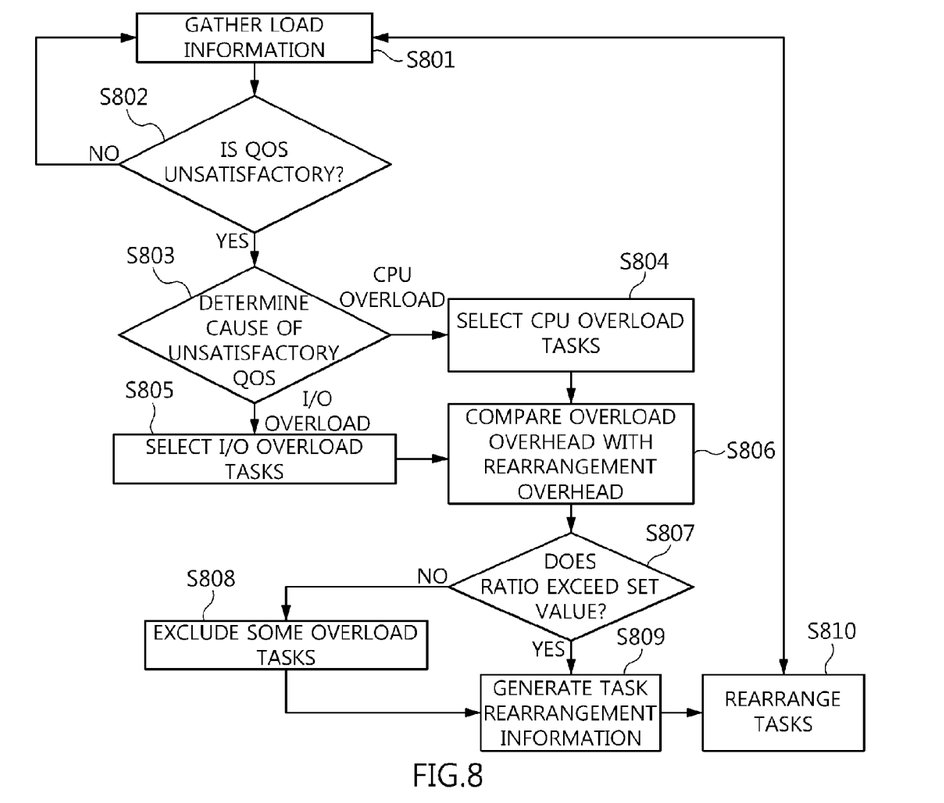
FIG. 8 is a flowchart illustrating a method of managing a data stream distributed parallel processing service according to another embodiment of the present invention.

FIG. 8 is a flowchart illustrating a method of managing a data stream distributed parallel processing service according to another embodiment of the present invention.

As described above, the method of managing a data stream distributed parallel processing service according to another embodiment of the present invention may have the following configurations in order to find an appropriate point of compromise between overhead occurring in a process of rearranging tasks and improved performance obtained after the tasks have been rearranged.

More particularly, the QoS monitoring unit 413 may determine QoS, including whether I/O overload has occurred between a plurality of tasks and whether task CPU overload has occurred, based on information about the load of the tasks and information about the load of a plurality of nodes. If it is determined that the QoS is not met because the I/O overload has occurred between the tasks or the task CPU overload has occurred, the QoS monitoring unit 413 may send a rearrangement request to the scheduling unit 414 so that the plurality of tasks is rearranged at the plurality of nodes. Furthermore, when the rearrangement request is received from the QoS monitoring unit 413, the scheduling unit 414 may compare the I/O overhead between the tasks or overload overhead attributable to the occurrence of the task CPU overload with rearrangement overhead attributable to the rearrangement of the plurality of tasks. Only when the ratio of the rearrangement overhead to the overload overhead exceeds a specific set value, the scheduling unit 414 may rearrange the tasks.

FIG. 8 is a flowchart illustrating the above configurations. First, the scheduling unit 414 gathers load information, including information about the load of a plurality of tasks and information about the load of a plurality of nodes at step S801. Thereafter, the scheduling unit 414 determines whether QoS is not met at step S802. If, as a result of the determination, it is determined that the QoS is met and thus there is no relevant service, the process returns to step S801. If, as a result of the determination, there is a service not meeting the QoS, the scheduling unit 414 determines the cause of not meeting QoS at step S803. If the cause of not meeting QoS is CPU overload, the scheduling unit 414 selects CPU overload tasks causing the CPU overload at step S804. If the cause of not meeting QoS is I/O overhead between the tasks, the scheduling unit 414 selects tasks, causing the I/O overload, as candidate tasks to be rearranged at step S805. Here, as described above, the rearrangement of the tasks requires rearrangement overhead, such as the temporary stopping of the execution of the tasks and the buffering of I/O data streams. The scheduling unit 414 compares overload overhead attributable to the I/O overload or the CPU overload with the rearrangement overhead attributable to the rearrangement of the tasks at step S806. If, as a result of the comparison, the ratio of the rearrangement overhead to the overload overhead exceeds a specific set value (YES at step S807), that is, if the rearrangement of the tasks is efficient despite the rearrangement overhead, the scheduling unit 414 transfers information about the tasks causing the I/O overload or information about the CPU overload to step S809 of generating task rearrangement information. If, as a result of the comparison, the ratio of the rearrangement overhead to the overload overhead is equal to or lower than the specific set value (NO at S807), that is, if the rearrangement of the tasks is inefficient because the rearrangement overhead is high, the scheduling unit 414 excludes some of the tasks to be rearranged, that is, tasks having relatively low overload, from the targets of the rearrangement at step S808 so that the ratio of the rearrangement overhead to the overload overhead exceeds the specific set value, and generates task rearrangement information using only tasks having high overload at step S809. Finally, the scheduling unit 414 rearranges the tasks in processes at separate nodes based on the gathered task rearrangement information at step S810.

In accordance with the present invention, there is provided the apparatus and method for managing a data stream distributed parallel processing service, which efficiently arrange a plurality of tasks in conformity with load characteristics and use communication means suitable for the structure of a task arrangement when successively processing a plurality of input data streams by executing a plurality of tasks in a distributed and parallel manner, thereby being able to reduce data Input/Output (I/O) load between the tasks of the service attributable to an explosive increase in the input data streams of tasks constituting the service and also to improve I/O performance and data processing performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus running on a processor for managing a data stream distributed parallel processing service, comprising:
   a service manager that registers a plurality of tasks constituting the data stream distributed parallel processing service using the processor;
   a Quality of Service (QoS) monitor that gathers information about an aggregate load of the plurality of tasks and information about an individual load of each of a plurality of nodes constituting a cluster which provides the data stream distributed parallel processing service; and
   a scheduler that arranges the plurality of tasks by distributing the plurality of tasks among the plurality of nodes based on the information about the aggregate load of the plurality of tasks and the information about the individual load of each of the plurality of nodes,
   wherein the information about the aggregate load of the plurality of tasks comprises information related to task Central Processing Unit (CPU) load and Input/Output (I/O) load between the tasks,
   wherein if I/O overload occurs between the tasks because the I/O load between the tasks is higher than the load of the plurality of nodes included in the information about the individual load of each of the plurality of nodes, the scheduler selects tasks, causing the I/O overload between the tasks, as I/O overload tasks, and rearranges the I/O overload tasks based on the information about the aggregate load of the plurality of tasks and the information about the I/O load between the tasks, and
   wherein the scheduler arranges the I/O overload tasks as separate threads of a single process at a single node.

2. The apparatus as set forth in claim 1, wherein the I/O overload tasks arranged as the separate threads of the single process perform data communication using a memory communication method in which a preceding task and a following task directly communicate with each other via a shared memory buffer with the shared memory buffer interposed between the preceding task and the following task.

3. The apparatus as set forth in claim 2, wherein other tasks, other than the I/O overload tasks arranged as the separate threads of the single process, which belong to the plurality of tasks, perform data communication using a network communication method in which a preceding task and a following task communicate with each other via a socket or a file I/O communication method in which a preceding task and a following task communicate with each other via a file.

4. The apparatus as set forth in claim 1, wherein if task CPU overload occurs because the task CPU load is higher than the load of the plurality of nodes included in the information about the individual load of each of the plurality of nodes, the scheduler selects tasks, causing the task CPU overload, as CPU overload tasks, and rearranges the CPU overload tasks based on the information about the aggregate load of the plurality of tasks and the information about the CPU load.

5. The apparatus as set forth in claim 4, wherein the scheduler arranges the CPU overload tasks as separate processes at separate nodes based on a speed and number of cores disposed at the plurality of nodes.

6. The apparatus as set forth in claim 1, wherein the QoS monitor determines QoS, including information about whether I/O overload has occurred between the tasks and whether task CPU overload has occurred, based on the information about the aggregate load of the plurality of tasks and the information about the individual load of each of the plurality of nodes, and, if it is determined that the QoS is unsatisfactory because the I/O overload has occurred between the tasks or the task CPU overload has occurred, sends a rearrangement request to the scheduler so that the plurality of tasks is rearranged at the plurality of nodes.

7. The apparatus as set forth in claim 6, wherein when the rearrangement request is received from the QoS monitor, the scheduler compares the overload overhead attributable to the occurrence of the I/O overload between the tasks or the task CPU overload with rearrangement overhead attributable to the rearrangement of the plurality of tasks, and rearranges the tasks only when a ratio of the rearrangement overhead to the overload overhead exceeds a specific set value.

8. A method of managing a data stream distributed parallel processing service, comprising:
- registering, by a service manager, a plurality of tasks constituting the data stream distributed parallel processing service;
- gathering, by a QoS monitor, information about an aggregate load of the plurality of tasks and information about an individual load of each of a plurality of nodes constituting a cluster which provides the data stream distributed parallel processing service;
- arranging, by a scheduler, the plurality of tasks by distributing the plurality of tasks among the plurality of nodes based on the information about the aggregate load of the plurality of tasks and the information about the individual load of each of the plurality of nodes;
- if I/O overload has occurred between the tasks because the I/O load between the tasks is higher than the load of the plurality of nodes included in the information about the individual load of each of the plurality of nodes, selecting, by the scheduler, tasks causing the I/O overload between the tasks, as I/O overload tasks; and
- rearranging, by the scheduler, the I/O overload tasks based on the information about the aggregate load of the plurality of tasks and the information about the I/O load between the tasks,
- wherein the information about the aggregate load of the plurality of tasks comprises information related to task CPU load and I/O load between the tasks, and
- wherein the rearranging the I/O overload tasks comprises arranging the I/O overload tasks as separate threads of a single process at a single node.

9. The method as set forth in claim 8, further comprising performing, by the I/O overload tasks arranged as the separate threads of the single process, data communication using a memory communication method in which a preceding task and a following task directly communicate with each other via a shared memory buffer with the shared memory buffer interposed between the preceding task and the following task.

10. The method as set forth in claim 9, further comprising performing data communication, by other tasks, other than the I/O overload tasks arranged as the separate threads of the single process, which belong to the plurality of tasks, using a network communication method in which a preceding task and a following task communicate with each other via a socket or a file I/O communication method in which a preceding task and a following task communicate with each other via a file.

11. The method as set forth in claim 8, further comprising:
- if a task CPU overload has occurred because the task CPU load is higher than the load of the plurality of nodes included in the information about the individual load of each of the plurality of nodes,
- selecting, by the scheduler, tasks, causing the task CPU overload, as CPU overload tasks; and
- rearranging, by the scheduler, the CPU overload tasks based on the information about the aggregate load of the plurality of tasks and information about the CPU load.

12. The method as set forth in claim 11, wherein the rearranging the CPU overload tasks comprises arranging the CPU overload tasks as separate processes at separate nodes based on a speed and number of cores disposed at the plurality of nodes.

13. The method as set forth in claim 8, further comprising:
- Determining, by the QoS monitor, QoS, including information about whether an I/O overload has occurred between the tasks and whether a task CPU overload has occurred, based on the information about the aggregate load of the plurality of tasks and the information about the individual load of each of the plurality of nodes; and
- if it is determined that the QoS is unsatisfactory because the I/O overload has occurred between the tasks or the task CPU overload has occurred, sending, by the QoS monitor, a rearrangement request to the scheduler so that the plurality of tasks can be rearranged at the plurality of nodes.

14. The method as set forth in claim 13, further comprising:
- when the rearrangement request is received from the QoS monitor, comparing, by the scheduler, the overload overhead attributable to the occurrence of the I/O overload between the tasks or the task CPU overload with rearrangement overhead attributable to the rearrangement of the plurality of tasks; and
- rearranging, by the scheduler, the tasks only when a ratio of the rearrangement overhead to the overload overhead exceeds a specific set value.

* * * * *